(12) United States Patent
Konishi et al.

(10) Patent No.: US 7,841,649 B2
(45) Date of Patent: Nov. 30, 2010

(54) VEHICLE BODY STRUCTURE

(75) Inventors: Masashi Konishi, Isehara (JP); Hidekazu Saitou, Hiratsuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 255 days.

(21) Appl. No.: 12/019,968

(22) Filed: Jan. 25, 2008

(65) Prior Publication Data

US 2008/0238152 A1    Oct. 2, 2008

(30) Foreign Application Priority Data

Mar. 30, 2007    (JP) .............................. 2007-094605

(51) Int. Cl.
*B62D 21/03* (2006.01)
(52) U.S. Cl. .................... 296/193.02; 296/30
(58) Field of Classification Search ................ 296/29, 296/30, 63, 70, 72, 187.08, 187.11, 187.12, 296/193.02, 193.07, 203.01, 203.04, 204
See application file for complete search history.

(56) References Cited

U.S. PATENT DOCUMENTS

| | | | | |
|---|---|---|---|---|
| 4,729,156 A | * | 3/1988 | Norris et al. ................ | 29/401.1 |
| 4,775,181 A | * | 10/1988 | Shoda .................... | 296/203.04 |
| 5,193,879 A | * | 3/1993 | Chen ...................... | 296/177 |
| 5,350,214 A | * | 9/1994 | Yamauchi et al. ........... | 296/204 |
| 5,352,011 A | * | 10/1994 | Kihara et al. .......... | 296/203.03 |
| 5,354,115 A | * | 10/1994 | Esaki .................. | 296/203.03 |
| 5,362,120 A | * | 11/1994 | Cornille, Jr. ........... | 296/203.01 |
| 5,409,289 A | * | 4/1995 | Kalian et al. .............. | 296/204 |
| 5,549,349 A | * | 8/1996 | Corporon et al. ........ | 296/187.12 |
| 5,641,194 A | * | 6/1997 | Honma et al. .......... | 296/203.03 |
| 5,921,618 A | * | 7/1999 | Mori et al. ............. | 296/187.12 |
| 6,045,174 A | * | 4/2000 | Brancaleone et al. ......... | 296/63 |
| 6,126,232 A | * | 10/2000 | Nakano ..................... | 296/210 |
| 6,371,545 B1 | * | 4/2002 | Yang .......................... | 296/63 |
| 7,407,223 B2 | * | 8/2008 | Ito et al. ................ | 296/193.07 |
| 7,448,674 B2 | * | 11/2008 | Brunner et al. ........ | 296/193.02 |

(Continued)

FOREIGN PATENT DOCUMENTS

EP    311849 A1 *    4/1989

(Continued)

OTHER PUBLICATIONS

Office Action in Chinese Patent Application No. 2008100065301 issued Sep. 25, 2009 and English translation thereof (12 pages).

(Continued)

*Primary Examiner*—Glenn Dayoan
*Assistant Examiner*—Paul A Chenevert
(74) *Attorney, Agent, or Firm*—Osha Liang LLP

(57) ABSTRACT

A vehicle body structure includes a cross member extending across a lateral direction of a vehicle, wherein the cross member is coupled to a vehicle body component and a reinforcing member installed to the cross member wherein the reinforcing member is spaced apart from a coupling portion of the cross member and the vehicle body component. A method to reinforce a cross member of a vehicle body includes installing at least one reinforcing member along the cross member and locating at least one edge of the at least one reinforcing member a selected distance from at least one coupling portion between the cross member and a vehicle body component.

17 Claims, 9 Drawing Sheets

U.S. PATENT DOCUMENTS

| | | | |
|---|---|---|---|
| 7,631,918 B2 * | 12/2009 | Yasukouchi et al. | 296/30 |
| 7,644,978 B2 * | 1/2010 | Tosaka et al. | 296/187.12 |
| 7,661,744 B2 * | 2/2010 | Maruno et al. | 296/65.16 |
| 2008/0203767 A1 * | 8/2008 | Cox et al. | 296/204 |
| 2009/0066118 A1 * | 3/2009 | Tosaka et al. | 296/204 |
| 2009/0108633 A1 * | 4/2009 | Ohi et al. | 296/204 |

FOREIGN PATENT DOCUMENTS

| | | | |
|---|---|---|---|
| FR | 2231215 | | 12/1974 |
| JP | 59124465 A | * | 7/1984 |
| JP | 62125956 A | * | 6/1987 |
| JP | 04212678 A | * | 8/1992 |
| JP | 06001267 A | * | 1/1994 |
| JP | 06211167 A | * | 8/1994 |
| JP | 07246956 | | 9/1995 |
| JP | 9-24863 A | | 1/1997 |
| JP | 2002154459 | | 5/2002 |
| JP | 2003-095130 | | 4/2003 |
| JP | 2006-015859 | | 1/2006 |
| JP | 2006232237 | | 9/2006 |
| KR | 1998-0007118 | | 4/1998 |
| KR | 1998-023486 | | 7/1998 |

OTHER PUBLICATIONS

Office Action in Korean Patent Application No. 10-2008-0028686 dispatched Oct. 12, 2009 and English translation thereof (16 pages).
English Patent Abstract of JP9-24863 from esp@cenet, published Jan. 28, 1997 (1 page).
Patent Abstracts of Japan publication No. 2003-095130, published Apr. 3, 2003 (2 pages).
Office Action in Korean Patent Application No. 10-2008-28686, dated May 29, 2009 (6 pages).
English translation of Office Action in Korean Patent Application No. 10-2008-28686, dated May 29, 2009 (8 pages).
English Patent Abstract of JP2006-015859 from esp@cenet, published Jan. 19, 2006 (1 page).
Office Action in European Patent Application No. 08153583.3-1523 issued Apr. 30, 2010 (3 pages).
European Search Report in European Patent Application No. 08153583.3, dated Jul. 31, 2009 (6 pages).
Patent Abstracts of Japan publication No. 2006232237, published Sep. 7, 2006 (1 page).
Patent Abstracts of Japan publication No. 2002154459, published May 28, 2002 (1 page).
Patent Abstracts of Japan publication No. 07246956, published Sep. 26, 1995 (1 page).

* cited by examiner

VEHICLE BODY STRUCTURE

CROSS-REFERENCE TO RELATED APPLICATIONS

The present application claims priority from Japanese Patent Application No. 2007-094605, filed Mar. 30, 2007, the contents of which are hereby incorporated by reference in their entirety.

BACKGROUND OF THE DISCLOSURE

1. Field of the Disclosure

The present invention relates to a vehicle body structure wherein a reinforcing member is installed at a cross member extended along a lateral direction of a vehicle.

2. Description of the Related Art

Japanese Laid-Open Patent Publication No. 2003-95130 discloses a vehicle body structure wherein a cross member extended along a lateral direction of a vehicle is installed. In such a structure, an end of the cross member is coupled to a side member extended along a front-to-rear direction of the vehicle body via a coupling member.

However, when a seat is attached to the cross member, for example, it may be advantageous to interpose a reinforcing member therebetween so as to increase the strength of attachment.

Further, the reinforcing member may be installed so as to be extended to a coupling portion of the cross member and another vehicle body component. In such a case, when the force of an impact is exerted to the seat from the rear of the vehicle resulting in a forwardly bend of the cross and the reinforcing members, an impact load to the seat may be concentrated at a coupling between the cross member and another vehicle body component.

SUMMARY OF THE CLAIMED SUBJECT MATTER

In one aspect, the present disclosure relates to a vehicle body structure including a cross member extending across a lateral direction of a vehicle, wherein the cross member is coupled to a vehicle body component and a reinforcing member installed to the cross member, wherein the reinforcing member is spaced apart from a coupling portion of the cross member and the vehicle body component.

In another aspect, the present disclosure relates to a method to reinforce a cross member of a vehicle body including installing at least one reinforcing member along the cross member, and locating at least one edge of the at least one reinforcing member a selected distance from at least one coupling portion between the cross member and a vehicle body component.

In another aspect, the present disclosure relates to a vehicle body structure including a cross member means for extending across a lateral direction of a vehicle, a means for coupling the cross member means to a vehicle body component, and a reinforcing means installed to the cross member means, wherein the reinforcing means is spaced away from the means for coupling.

BRIEF DESCRIPTION OF DRAWINGS

Features of the present disclosure will become more apparent from the following description in conjunction with the accompanying drawings.

DETAILED DESCRIPTION

Figure 1:
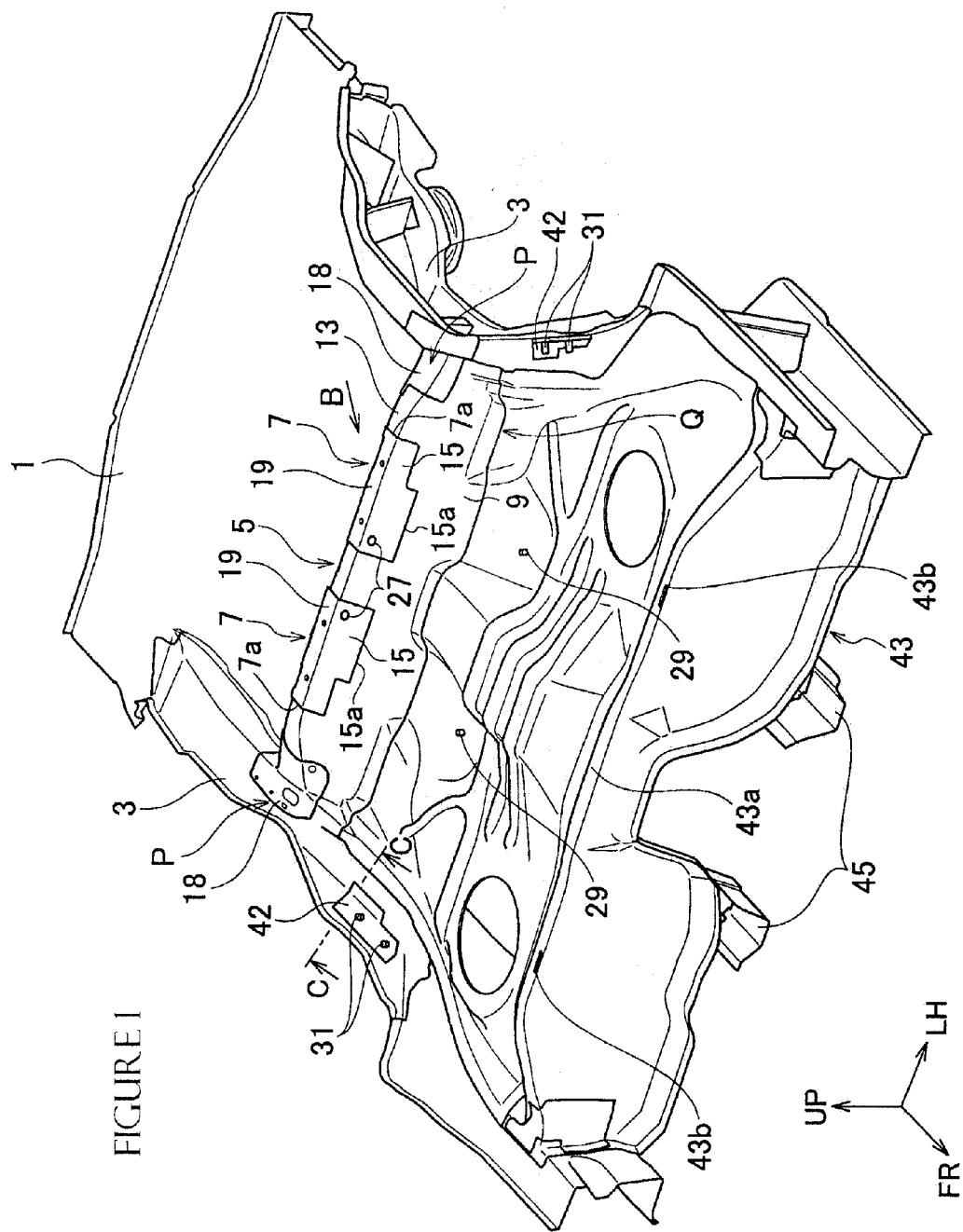
FIG. 1 is a perspective view of a vehicle body constructed in accordance with an embodiment of the present disclosure.
Figure 2:
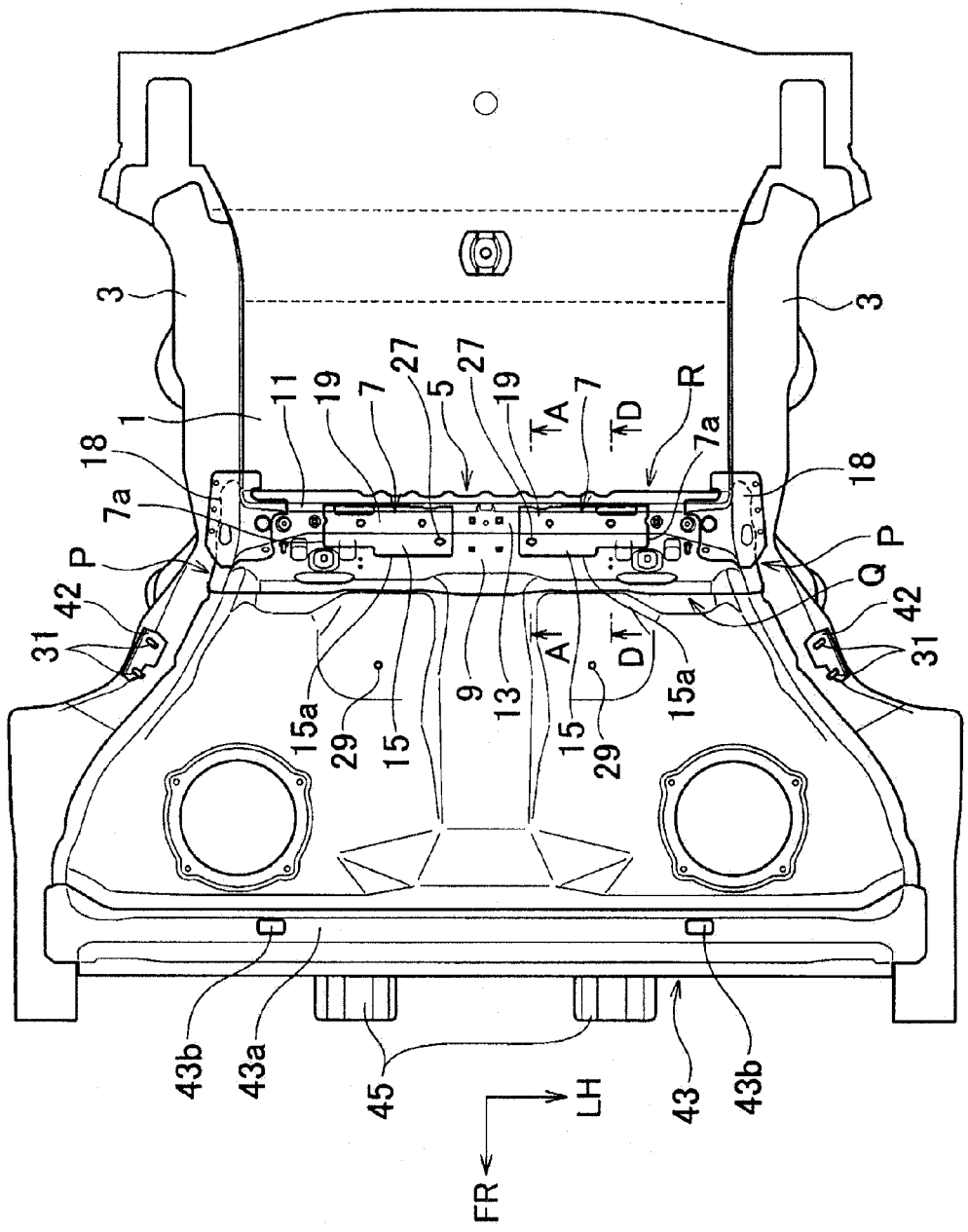
FIG. 2 is a plan view of the vehicle body shown in FIG. 1.

FIG. 1 is a perspective view of a vehicle body structure constructed in accordance with an embodiment of the present disclosure. FIG. 2 is a plan view of the vehicle body structure. The vehicle body structure is shown with a floor portion at a rear portion of the vehicle body. In FIG. 1, a direction indicated by an arrow FR represents the front of the vehicle body, a direction indicated by an arrow LH represents a left side of a lateral direction of the vehicle, and a direction indicated by an arrow UP represents an upper direction of the vehicle body.

In such a vehicle body structure, side members 3 extended along the front-rear direction of the vehicle body are coupled to both sides of a rear floor panel 1 in the lateral direction of the vehicle as a floor panel via welding operation. Further, a cross member 5 extended along the lateral direction of the vehicle is coupled to an approximate center portion of the rear floor panel 1 along the front-to-rear direction of the vehicle body via a welding operation. Also, both ends of the cross member 5 in the lateral direction of the vehicle are coupled to the side members 3 via a welding operation.

Also, a pair of reinforcing members 7 is coupled to the cross member 5 via a welding operation having the center portion in the lateral direction of the vehicle interposed therebetween. The pair of the right and left reinforcing members 7 may be symmetrically formed. While welding operations are specifically mentioned in this disclosure, it should be understood by one of ordinary skill in the art that any means of connection known to one of ordinary skill in the art may be used.

Figure 3:
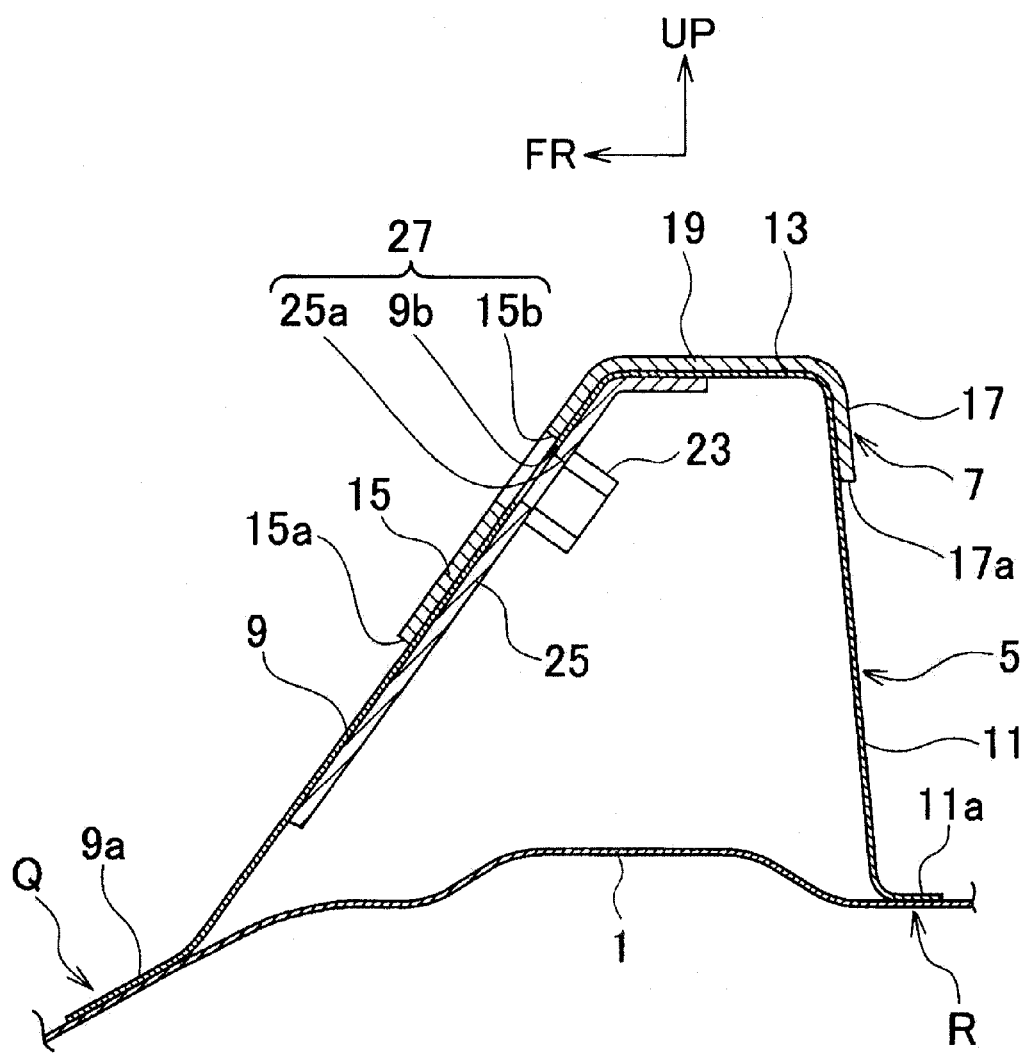
FIG. 3 is a cross-sectional view taken along line A-A shown in FIG. 2.

As shown in FIG. 3, which is a cross-sectional view taken along line A-A shown in FIG. 2, the cross member 5 is shown constructed as an opened cross-sectional structure with bottom rear floor panel 1 is adjacent to the opened side. The cross member 5 comprises: a mildly-inclined front surface 9 directed toward the vehicle front, a steeply-inclined rear surface 11 directed toward the vehicle rear, and a flat upper surface 13 directed toward the top of the vehicle and interconnecting front surface 9 and rear surface 11. Flanges 9a and 11a of bottom end portions of front surface 9 and rear surface 11 are coupled to the rear floor panel 1 via a welding operation.

Corresponding to a configuration of the cross member 5, the reinforcing member 7 comprises a front surface portion 15 bonded to cover an upper portion of the mildly-inclined front surface 9 of the cross member 5, a rear surface portion 17 bonded to cover an upper end portion of the steeply-inclined rear surface 11, and an upper surface portion 19 for interconnecting the front and rear surface portions 15 and 17 and to cover the flat upper surface 13.

As shown in FIG. 2, each reinforcing member 7 is configured such that an outer end 7a of reinforcing member 7 in the lateral direction of the vehicle is positioned inboard of a coupling portion P of the cross member 5 and the side member 3. In other words, the outer end 7a is located at a position, which is spaced apart (in an inward direction) from the coupling portion P. Further, as shown in FIG. 3, each reinforcing member 7 is configured such that a leading end 15a of the front surface portion 15 and a trailing end 17a of the rear surface portion 17 are located at positions spaced apart from coupling portions Q and R of the cross member 5 and the rear floor panel 1, respectively.

As such, each end 7a, 15a and 17a of the reinforcing member 7 is spaced apart from the coupling portions P, Q and R of the cross member 5 and other vehicle body components, respectively. Accordingly, a cross member 5 incorporating the reinforcing member 7 is provided with a weakened portion between each end 7a, 15a and 17a of the reinforcing member 7 and the coupling portions P, Q and R and another vehicle body components. Also, in the coupling portion P, the cross member 5 and the side member 3 are fixedly bonded at an upper portion side of the cross member 5 by using a connecting member 18.

Figure 4:
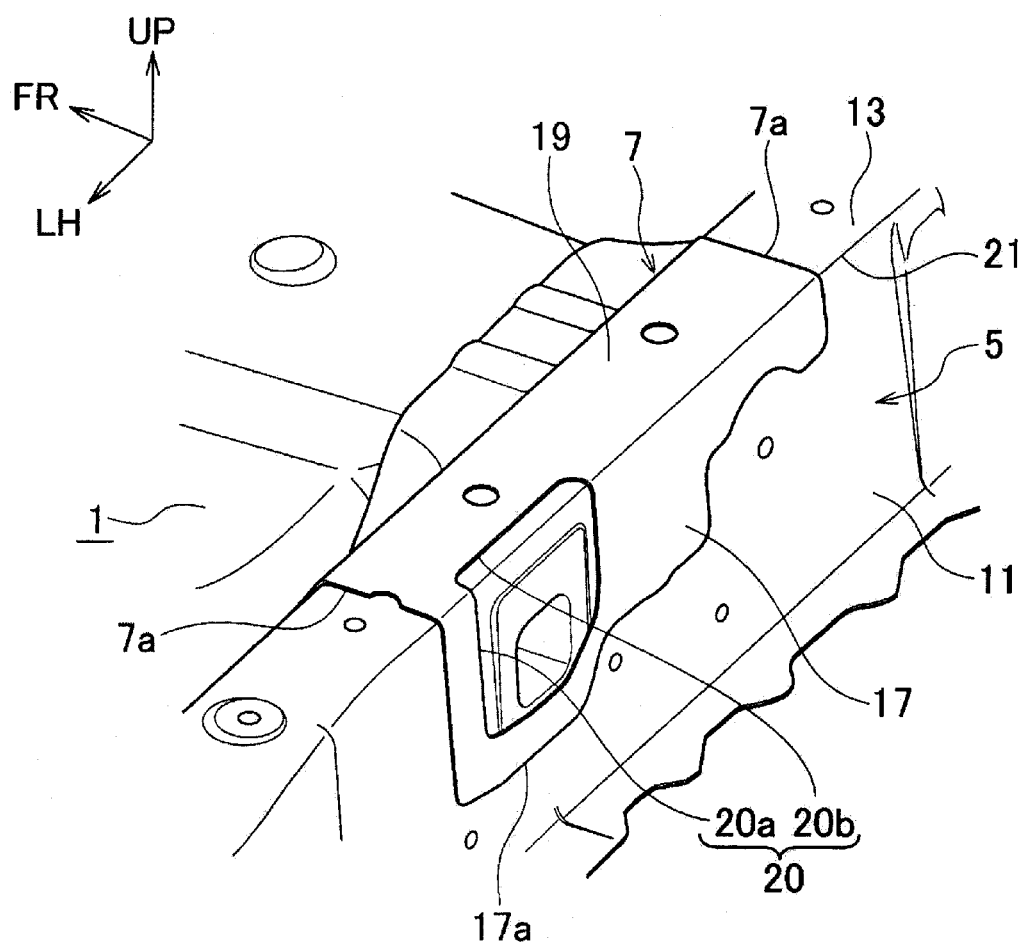
FIG. 4 illustrates a portion indicated by an arrow B shown in FIG. 1.

FIG. 4 illustrates a view indicated by an arrow B shown in FIG. 1. As shown in FIG. 4, an opening 20 is provided in reinforcing member 7 extending from the rear surface portion 17 to a rear edge of upper surface portion 19 of reinforcing member 7 in an outer position in the lateral direction of the vehicle of the reinforcing member 7. Thus, opening 20 includes an upper component 20b in upper surface portion 19 and a rear component 20a in rear surface portion 17. Thus, opening 20 provides access to a ridge portion 21 which is a boundary portion of the flat upper surface 13 and the steeply-inclined rear surface 11 of the cross member 5.

Therefore, because opening 20 is provided in the reinforcing portion 7, cross member 5 incorporating the reinforcing member 7 is also provided with a weakened portion corresponding to the location of opening 20.

Also, as shown in FIG. 4, the reinforcing member 7 is configured such that the height of the rear surface portion 17 laterally inward of opening 20 is shorter than the height of rear surface portion 17 surrounding opening 20.

Figure 5:
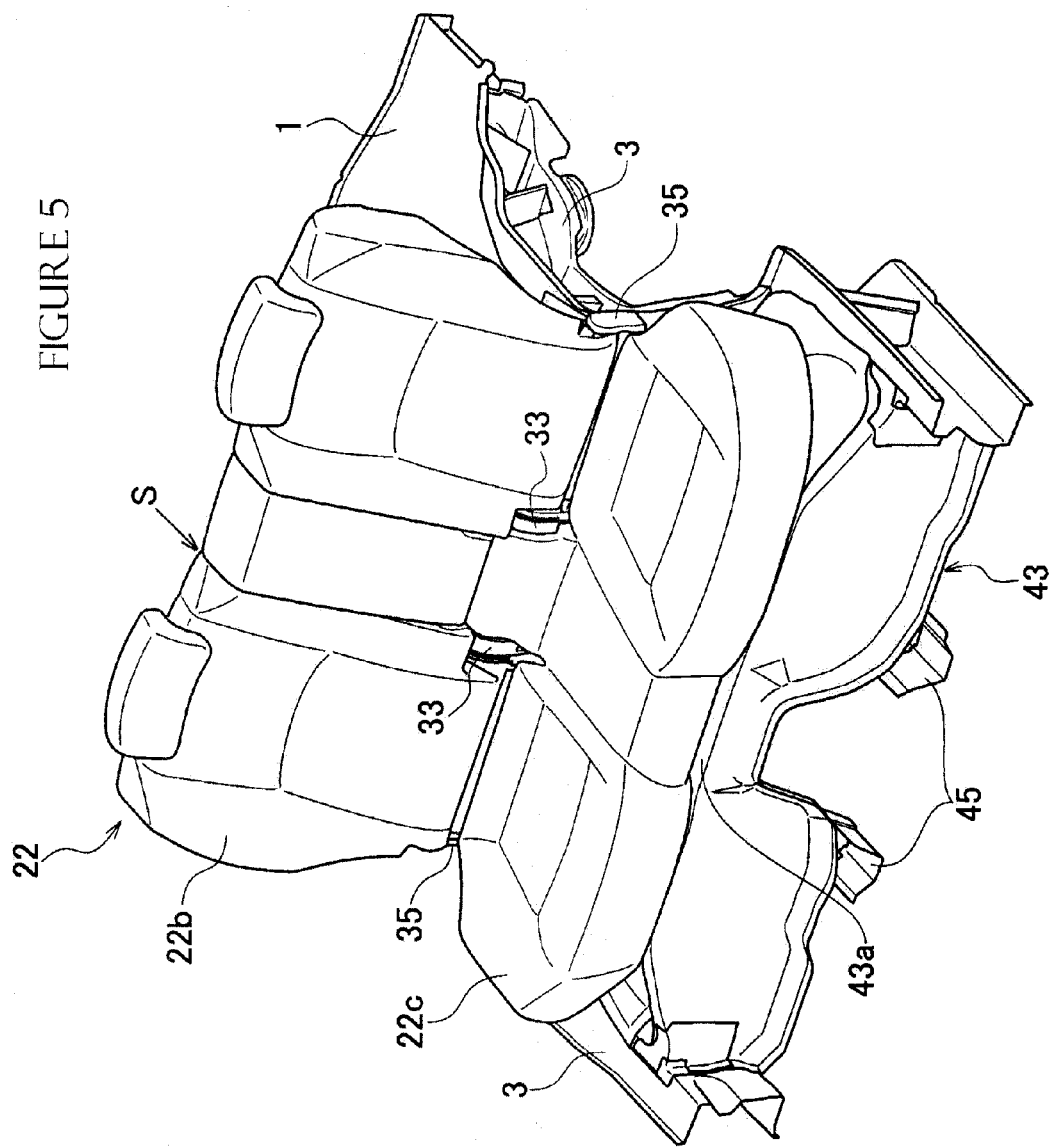
FIG. 5 is a perspective view illustrating a state wherein a rear seat is attached to a rear floor shown in FIG. 1.

As shown in FIG. 5, a rear seat 22 is installed on the rear floor panel 1 forward of a cross member 5 (not visible) having a pair of members 7 (not visible). Rear seat 22 includes a seat cushion 22c and a seatback 22b. The seatback 22b is divided into right and left parts at S. Further, the portion of cross member 5 in which the reinforcing member 7 is installed serves as a part of an attaching portion of the rear seat 22 to the vehicle body.

That is, as shown in FIG. 3, an attaching plate 25 having a nut 23 on its inner side may be fixed to a back surface of the cross member 5 by a welding operation. Further, an attaching hole 27 is provided, wherein the attaching hole 27 passes through the attaching plate 25, the mildly-inclined front surface 9 of the cross member 5 and the front surface portion 15 of the reinforcing member 7. The attaching hole 27 serves as an attaching portion. The attaching hole 27 includes a through hole 15b provided in the front surface portion 15 of the reinforcing member 7, a through hole 9b provided in the mildly-inclined front surface 9 of the cross member 5, and a through hole 25a provided in the attaching plate 25.

Further, as shown in FIGS. 1 and 2, a bottom stud bolt 29 protrudes in a generally upper direction of the vehicle body from the rear floor panel 1 forward of reinforcing member 7 and cross member 5. Bottom stud bolt 29 may serve to attach a portion of the rear seat 22. Similarly, two stud bolts 31 may obliquely protruded inwardly and upwardly from each side member 3 to attach rear seat 22. As such, the rear seat 22 may be fixed to the vehicle body using a total of six portions (three portions each in symmetrical positions).

Figure 6:
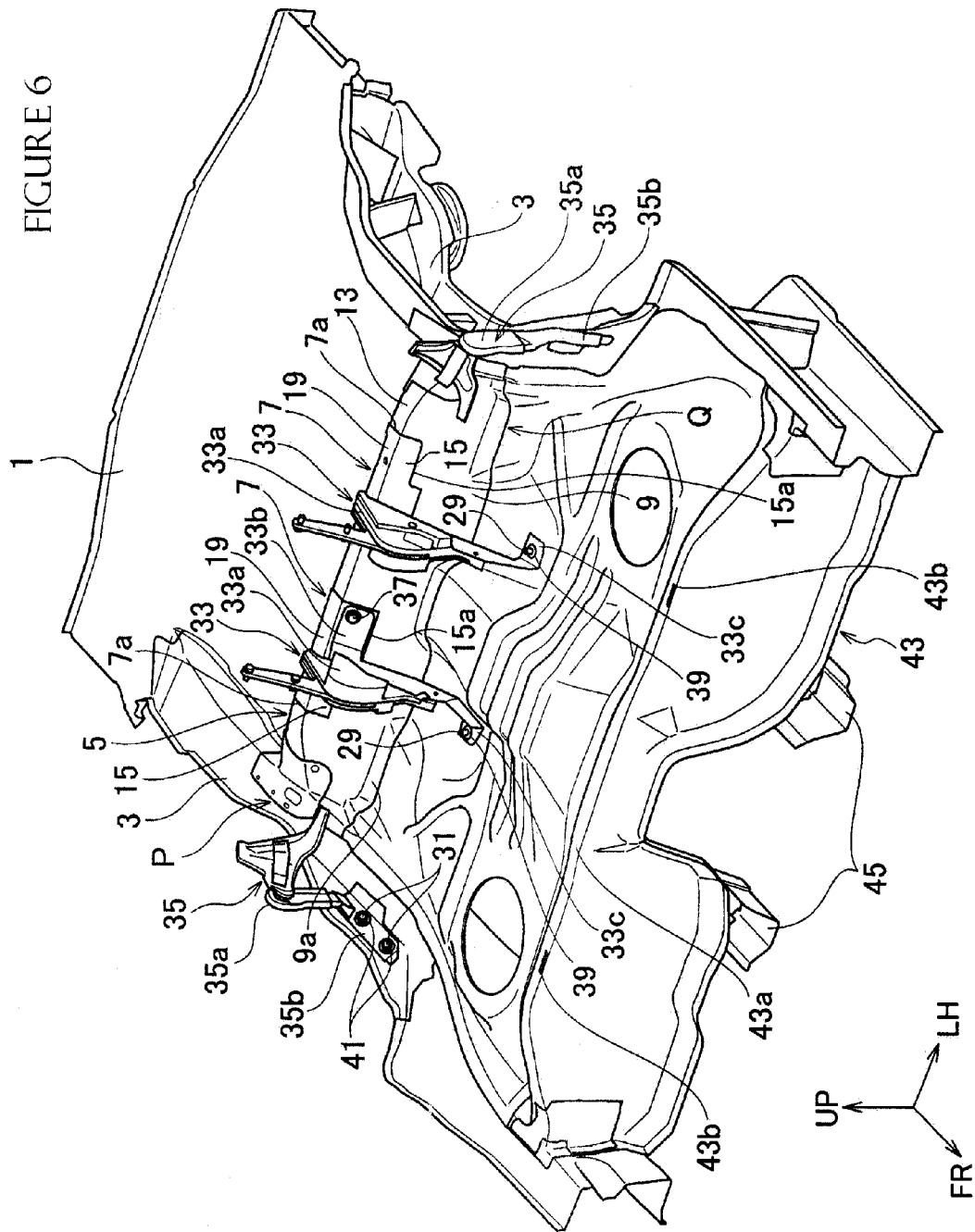
FIG. 6 is a perspective view illustrating a state wherein a reclining device installed at the rear seat shown in FIG. 5 is attached to the vehicle body shown in FIG. 1.

As shown in FIG. 6, the rear seat 22 may be attached via reclining devices 33 and 35. With reclining device 33 in a center portion, a rear attaching bracket 33b, which is protruded from a device body 33a laterally toward the center of the vehicle, may be fixed by fastening a bolt 37 to the nut 23 shown in FIG. 3. Further, a front attaching bracket 33c, which is protrudes from the device body 33a toward the front of the vehicle body, may be fixed by fastening a nut 39 to bottom portion stud bolt 29.

Figure 7:
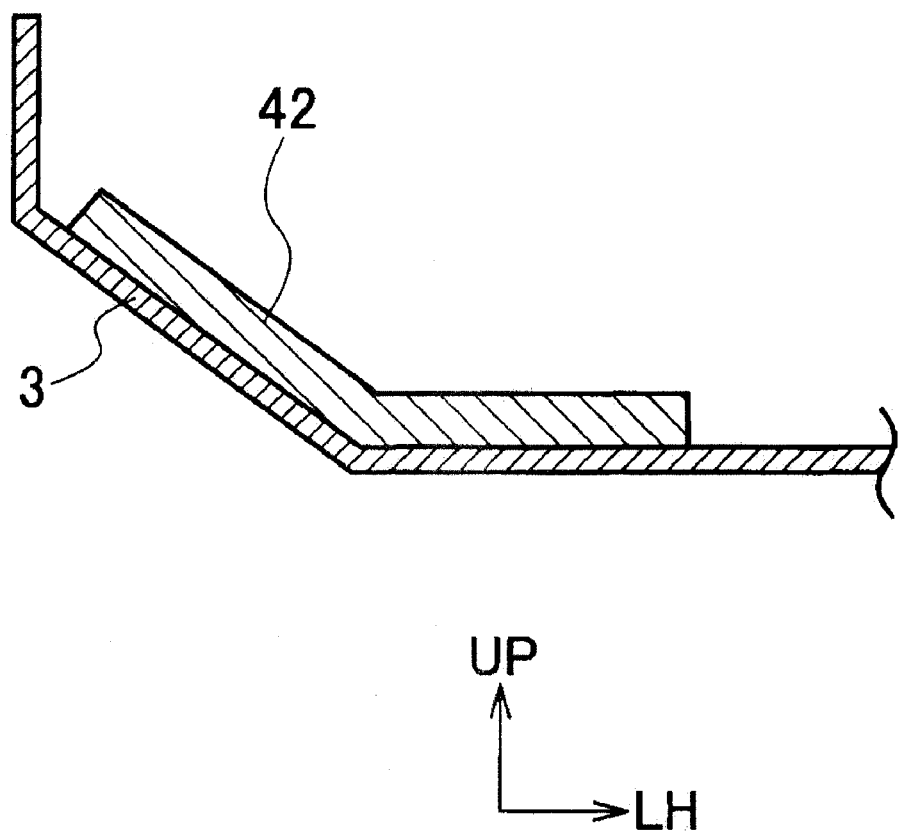
FIG. 7 is a cross-sectional view taken along line C-C shown in FIG. 1.

Additionally, in the reclining device 35 at an outer side in the lateral direction of the vehicle, an attaching bracket 35b, which is protruded from a device body 35a toward the front of the vehicle body, may be fixed by fastening a nut 41 to the stud bolt 31. Further, as shown in FIG. 7 illustrating a cross-section taken along line C-C shown in FIG. 1, an attaching portion of the attaching bracket 35b may be reinforced by fixedly bonding a side member reinforcing member 42 to an inner side of the side member 3 via a welding operation.

Also, an upper edge of a bulkhead 43 may be fixedly bonded to a forward end of the rear floor panel 1 via a welding operation. Further, a coupling hole 43b may be provided in a flange 43a bent toward the rear of the vehicle body of the upper edge. A coupling projection (not shown) provided in a front lower portion of the seat cushion 22c of the rear seat 22, may be inserted into the coupling hole 43b and therefore fixedly coupled thereto.

Both ends of the bulkhead 43 in the lateral direction of the vehicle may be fixedly bonded to the side member 3 via a welding operation. A central bottom portion of the bulkhead 43 in the lateral direction of the vehicle may be fixedly bonded to two central members 45 extended along the front-to-rear (FR) direction of the vehicle body via a welding operation.

Next, when the force of an impact load is exerted to a vehicle including the vehicle body structure described above from the rear of the vehicle body or when a sudden braking operation is performed, the seatback 22b of the rear seat 22 may be particularly subjected to impact due to a movement of the loaded articles housed within a luggage compartment in the rear of the vehicle body.

Figure 8:
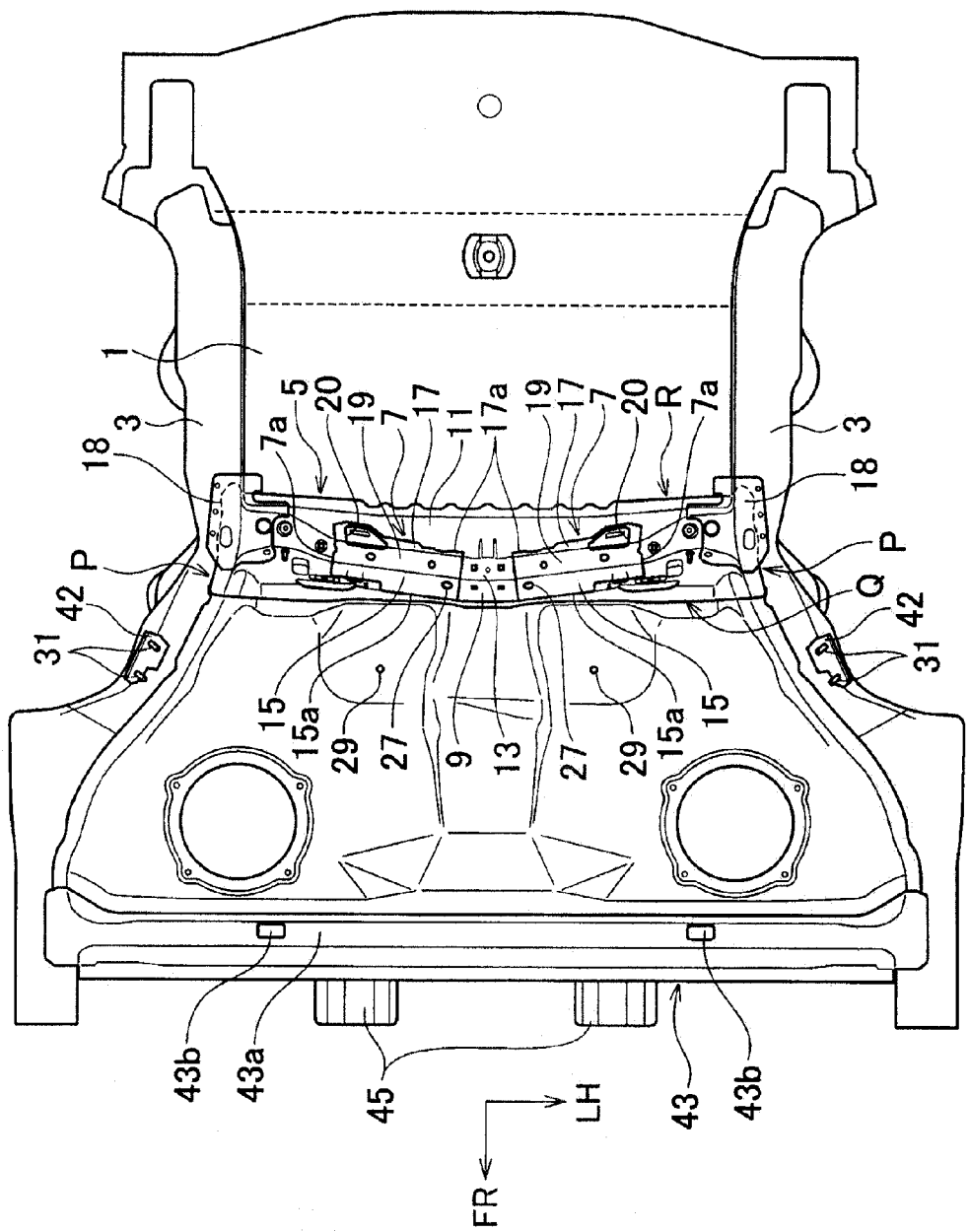
FIG. 8 illustrates a state wherein the cross member is bent to the front of the vehicle body shown in FIG. 2.
Figure 9A:
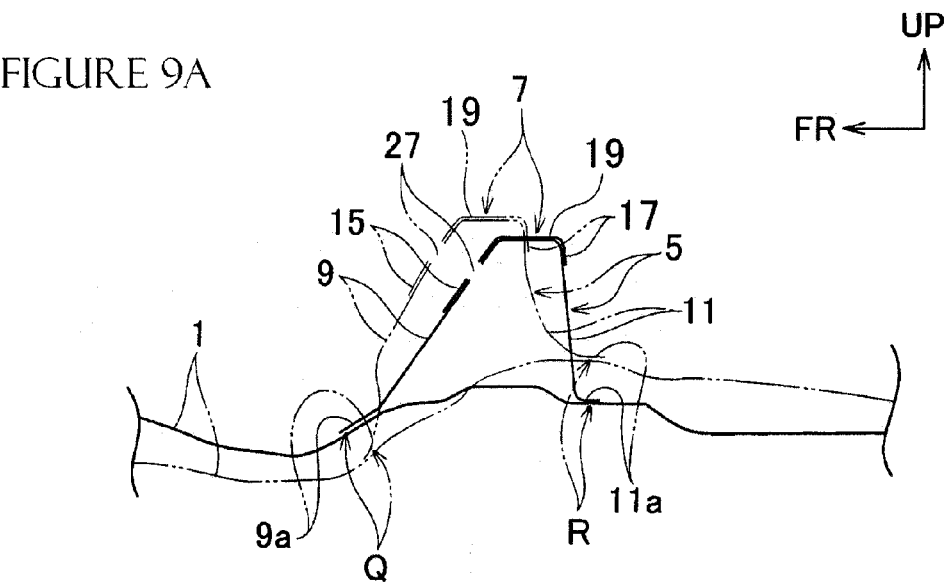
FIG. 9A illustrates a state before and after the cross member is bent to the front of the vehicle body at a position shown in FIG. 3.

As shown in FIG. 8, an impact load may be exerted to the seatback 22b (shown in FIG. 5), such that a center portion of cross member 5 between a pair of the right and left reinforcing members 7 may become weakened and bent so as to protrude toward the front of the vehicle body (in direction FR). Referring now to FIG. 9A, the solid line indicates a portion corresponding to FIG. 3 (i.e., prior to a bending deformation) and the double dot-chain line indicates the portion following bending deformation. Further, in FIG. 9B, the solid line indicates a portion corresponding to the cross-section taken along line D-D shown in FIG. 2 prior to the bending deformation and the double dot-chain line indicates the portion after the bending deformation.

As disclosed in the preceding figures and specification, a bending deformation amount of the cross member 5 to the front (i.e., a moving amount toward the front of the vehicle body) may be restrained by the reinforcing member 7. Further, the reinforcing member 7 may be installed in a region in which the nut 23 is attached (shown in FIG. 3). Thus, a disengagement of the nut 23 may be prevented when the impact load is exerted to the seatback 22b toward the front of the vehicle body.

Advantageously, the reinforcing member 7 may be installed to cross member 5 such that outer side end 7a in the lateral direction of the vehicle is located at a position inboard and spaced from the coupling portion P of the cross member 5 and the side member 3. Similarly, the leading end 15a of the front surface portion 15 and the trailing end 17a of the rear surface portion 17 may be located at positions spaced from the coupling portions Q and R of the cross member 5 and the rear floor panel 1. By doing so, the regions wherein the reinforcing member 7 is not installed to cross member 5 may serve as weakened portions.

Therefore, when a front buckling deformation of the cross member 5 occurs, elevated stress concentrations at each coupling portion P, Q and R may be avoided such that the stress resulting from the impact load may be dispersed. Therefore, the coupling integrity of the coupling portions P, Q and R may be maintained without resulting in fractures from elevated stress concentrations. That is, when the impact load is exerted, the cross member 5 begins to bend at the weakened portion provided around the end of the reinforcing member 7 (rather than fracture) and the stress of the impact load is dispersed. Therefore, elevated stress concentrations at the coupling portions of the cross member 3 and other vehicle body components may be prevented, thereby preventing the fractures.

Figure 9B:
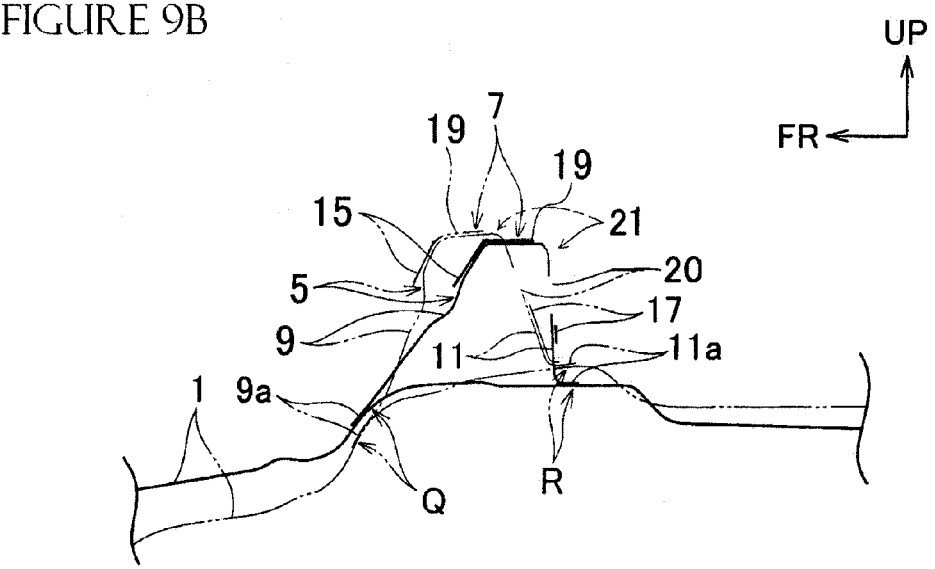
FIG. 9B illustrates a state before and after the cross member is bent to the front of the vehicle body at a region corresponding to the cross-section taken along line D-D shown in FIG. 2.

Further, as shown in FIG. 4, the opening 20 may serve as a weakened portion and may be provided in a portion from the rear surface portion 17 of reinforcing member 7 to trailing portion of the upper surface portion 19. Thus, the cross member 5 may be easily deformed to bend to the front. Also, as shown in FIG. 9A, a downward component of the bending deformation, particularly toward the front of the upper portion as shown in FIG. 9B, may becomes larger than shown in FIG. 9A. Therefore, the stress may be more dispersed.

Also, the opening portion 20 is continuously provided in the ridge portion 21, which is a boundary portion of the flat upper surface 13 and the steeply-inclined rear surface 11 of the cross member 5. Further, the ridge 21 is partially exposed through the opening portion 20. Thus, the deformation of the cross member 5 can be easily carried out, thereby avoiding the stress concentration to each coupling portion P, Q and R.

Further, a pair of reinforcing members 7 may be installed at both sides of the cross member 5 having a center portion of the cross member 5 in the lateral direction of the vehicle interposed therebetween. Thus, when the impact load is exerted to the cross member 5 from the rear, the weakened portion of the center portion in the lateral direction of the vehicle may be bent, resulting in the stress dispersing effect.

As described in reference to FIG. 4, the reinforcing member 7 is configured such that the height of the rear surface portion 17 laterally inward of opening 20 is shorter than that of the outer portion surrounding opening 20. Thus, the weakened portion of the center portion in the lateral direction of the vehicle may be more able to bend.

As such, reinforcing members 7 may be installed at the cross member 5 to increase a strength of the cross member 5 and an attaching strength of a rear seat 22. However, when the impact load is exerted to the rear seat 22 from the rear of the vehicle body, the stress concentration at coupling portions (e.g., P, Q and R) of the cross member 5 and other vehicle body components (e.g., the side member 3 or rear floor panel 1) may be reduced.

Accordingly, when an impact load is exerted to cross member 5, the stress is first concentrated around an end of reinforcing member 7 and deformation tends to begin at this portion. Then, the stress of the impact load is dispersed so as to be transferred to a coupling portion (e.g., P, Q, and R) of the cross member 5 and another component of the vehicle body. Therefore, fracture from excess stress concentration to such a coupling portion may be prevented.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A vehicle body structure, comprising:
   a cross member extending across a lateral direction of a vehicle, wherein the cross member is coupled to a vehicle body component; and
   a reinforcing member installed to the cross member,
   wherein a first coupling portion between the reinforcing member and the cross member is spaced apart from a second coupling portion between the cross member and the vehicle body component,
   wherein the reinforcing member comprises:
   a front surface portion corresponding to a front surface of the cross member;
   a rear surface portion corresponding to a rear surface of the cross member; and
   an upper surface portion connecting the front and rear surface portions and corresponding to an upper surface of the cross member,
   wherein an opening is provided at the rear surface portion of the reinforcing member and is provided to expose a ridge portion of the cross member extending along the lateral direction between the rear and upper surfaces of the cross member.

2. The vehicle body structure of claim 1, wherein the vehicle body component comprises a side member extending along a front-to-rear direction of the vehicle body.

3. The vehicle body structure of claim 1, wherein the vehicle body component comprises a floor panel.

4. The vehicle body structure of claim 1, wherein a pair of the reinforcing members are installed at opposing sides of the cross member such that an un-reinforced center portion of the cross member is interposed therebetween.

5. The vehicle body structure of claim 1, comprising a seat attached to a portion of the cross member where the reinforcing member is installed.

6. The vehicle body structure of claim 1, comprising a pair of reinforcing members installed at opposite ends of the cross member such that a non-reinforced center portion of the cross member is interposed therebetween.

7. The vehicle body structure of claim 1, wherein edges of the reinforcing member are spaced apart from the second coupling portion.

8. A method to reinforce a cross member of a vehicle body, the method comprising:
   installing at least one reinforcing member along the cross member; and
   locating at least one edge of the at least one reinforcing member a selected distance from at least one coupling portion between the reinforcing member and a vehicle body component, wherein the reinforcing member comprises:
- a front surface portion corresponding to a front surface of the cross member;
- a rear surface portion corresponding to a rear surface of the cross member; and
- an upper surface portion connecting the front and rear surface portions and corresponding to an upper surface of the cross member,
- wherein an opening is provided at the rear surface portion of the reinforcing member and is provided to expose a ridge portion of the cross member extending along the lateral direction between the rear and upper surfaces of the cross member.

9. The method of claim 8, wherein the selected distance is configured to reduce stress concentration at the at least one coupling portion upon transverse deflection of the cross member.

10. The method of claim 8, further comprising mounting a vehicle seat to the cross member proximate to the at least one reinforcing member.

11. The method of claim 8, wherein the reinforcing member is configured to limit bending of the cross member and to allow bending of the at least one coupling portion upon transverse deflection of the cross member.

12. The method of claim 8, further comprising attaching a seat to the cross member proximate to the at least one reinforcing means.

13. A vehicle body structure, comprising:
- a means for extending across a lateral direction of a vehicle;
- a means for coupling the means for extending across to a vehicle body component; and
- a means for reinforcing installed to the means for extending across, wherein the means for reinforcing is spaced away from the means for coupling,
- wherein the means for reinforcing comprises:
  - a front surface portion corresponding to a front surface of the means for extending across;
  - a rear surface portion corresponding to a rear surface of the means for extending across; and
  - an upper surface portion connecting the front and rear surface portions and corresponding to an upper surface of the means for extending across,
  - wherein an opening is provided at the rear surface portion of the means for reinforcing and is provided to expose a ridge portion of the means for extending across extending along the lateral direction between the rear and upper surfaces of the means for extending across.

14. The vehicle body structure of claim 13, wherein the means for reinforcing is configured to reduce stress concentration at the means for coupling upon transverse deflection of the means for extending across.

15. The vehicle body structure of claim 13, further comprising a pair of the means for reinforcing installed at opposite sides of the means for extending across such that an un-reinforced center portion of the means for extending across exists therebetween.

16. The vehicle body structure of claim 13, comprising a means for sitting attached to the means for extending across proximate to the means for reinforcing.

17. The vehicle body structure of claim 13, wherein edges of the means for reinforcing are spaced apart from the means for coupling.

* * * * *